(12) United States Patent
Erdtmann et al.

(10) Patent No.: US 6,586,498 B1
(45) Date of Patent: Jul. 1, 2003

(54) INK JET INK

(75) Inventors: David Erdtmann, Rochester, NY (US); Alan R. Pitt, Sandridge (GB); Ian M. Newington, Hazlemere (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/710,346

(22) Filed: Nov. 9, 2000

(51) Int. Cl.[7] .................. C08L 61/10; C08G 8/28; C09D 11/10
(52) U.S. Cl. ............ 523/160; 524/594; 524/595; 525/505; 525/508
(58) Field of Search ................ 523/160, 161; 106/31.6; 524/594, 595; 525/505, 508

(56) References Cited

U.S. PATENT DOCUMENTS

| | | | | |
|---|---|---|---|---|
| 3,049,511 A | * | 8/1962 | Kirkpatrick et al. | 55/505 |
| 4,156,616 A | * | 5/1979 | Dietz et al. | 106/503 |
| 5,457,012 A | * | 10/1995 | Nair et al. | 430/495 |
| 5,585,334 A | * | 12/1996 | Shaw | 507/257 |
| 5,707,433 A | * | 1/1998 | Kuge et al. | 106/31.86 |
| 6,143,807 A | * | 11/2000 | Lin et al. | 523/161 |
| 6,245,138 B1 | * | 6/2001 | Nyssen et al. | 106/31.86 |
| 6,294,592 B1 | * | 9/2001 | Herrmann et al. | 522/75 |

FOREIGN PATENT DOCUMENTS

| | | |
|---|---|---|
| DE | 198 01 759 A 1 | 1/1998 |
| DE | 198 50 152 A 1 | 10/1998 |

OTHER PUBLICATIONS

Harry J. Spinelli, "Polymeric Dispersants in Ink Jet Technology" pp. 1215–1218.

* cited by examiner

Primary Examiner—Vasu Jagannathan
Assistant Examiner—Callie E. Shosho
(74) Attorney, Agent, or Firm—Harold E. Cole

(57) ABSTRACT

An ink jet ink composition comprising from about 0.5% to about 30% by weight of a pigment, a carrier and a dispersant, the dispersant comprising an anionic derivative of an ethoxylated alkylphenol-formaldehyde resin, the ratio of dispersant:pigment being from about 0.1:1 to about 5:1.

15 Claims, No Drawings

INK JET INK

CROSS REFERENCE TO RELATED APPLICATIONS

Reference is made to commonly assigned, co-pending U.S. patent application Ser. No. 09/710,323 by Erdtmann et al., filed concurrently herewith entitled "Ink Jet Printing Method"; the disclosure of which is hereby incorporated by reference.

FIELD OF THE INVENTION

This invention relates to a dispersant for a pigment-based ink jet ink.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Molecules of the carrier surround each individual dye molecule. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigment-based inks are prepared by incorporating the pigment in the continuous water phase by a milling and dispersing process. Pigment-based inks require a water-soluble dispersant in the pigment slurry during the milling process. Such a dispersant is necessary to produce a stable colloidal mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Many dispersing agents are very selective in their ability to disperse these pigments to sub-micron size. This is probably one of the many reasons for the wide variety of known dispersing agents. In many instances, each class of pigments may require a specific dispersing agent. Another problem encountered with some dispersing agents is that the resulting inks suffer from unacceptable image quality properties. This can include unacceptable coalescence, banding, bleeding, densities, or other defects seen on the final printed image. Yet another problem with many commercially available dispersants is that they yield dispersions with very low surface tensions. Thus, there is a continuing need for improved dispersing agents for pigment-based inks.

DESCRIPTION OF RELATED ART

German patent application DE 19850152 discloses the use of ethoxylated alkyl-phenol surfactants for use in the preparation of pigment-based inks for ink-jet printing. However, there is a problem with these dispersants in that pigment dispersions using them have an unacceptably large particle size and are unstable at high temperatures, as will be shown hereinafter.

German patent application DE 19801759 discloses the use of sulfonated aromatic derivatives as dispersants for a wide range of pigment preparations including those in ink-jet printing. However, these dispersants differ significantly in structure to the materials employed in the invention.

It is an object of this invention to provide a dispersant for a pigment-based ink jet ink which will enable the particle size of the dispersed pigment to be lower than that obtained using prior art dispersants disclosed for such use. It is another object of this invention to maintain such particle size for the pigment when the dispersion is held at high temperatures. It is another object of this invention to provide a dispersant for pigment-based ink-jet inks which will produce images which have a high D-max and which are free of defects.

SUMMARY OF THE INVENTION

These and other objects are achieved in accordance with this invention which relates to an ink jet ink composition comprising from about 0.5% to about 30% by weight of a pigment, a carrier and a dispersant, the dispersant comprising an anionic derivative of an ethoxylated alkylphenol-formaldehyde resin, the ratio of dispersant:pigment being from about 0.1:1 to about 5:1.

Use of the dispersants in the invention will produce pigment dispersions on the order of 0.1 $\mu$m or less in size during the milling process. These dispersions are also characterized by excellent colloidal stability and lack of flocculation and/or sedimentation on keeping at high temperatures. In addition, these dispersing agents are useful with a wide variety of pigments.

DETAILED DESCRIPTION OF THE INVENTION

Any anionic derivative of an ethoxylated alkylphenol-formaldehyde resin dispersant may be used in the invention provided it produces the desired results. In a preferred embodiment of the invention, the dispersant has the formula:

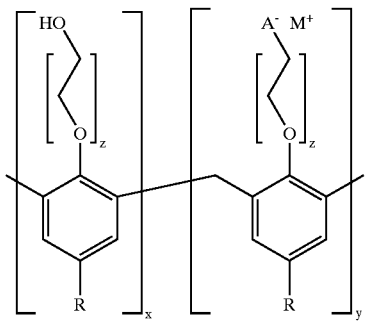

wherein: each R independently represents a linear or branched alkyl, alkenyl, or arylalkyl group having from about 4 to about 30 carbon atoms;

x is an integer from 0 to 20;

y is an integer from 1 to 20; with the proviso that x+y is from 2 to 20;

z is an integer from 4 to 20;

A is an anionic group, such as sulfate, sulfonate, phosphate, phosphonate or carboxylate; and M is a cationic group, such as an alkali metal, alkaline earth metal, ammonium or substituted ammonium.

In a preferred embodiment of the invention, each R independently represents a linear or branched alkyl, alkenyl, or arylalkyl group having from about 6 to 15 carbon atoms, preferably from about 8 to about 12 carbon atoms. In another preferred embodiment, x+y is from 4 to 12, preferably 6 to 8. In still another preferred embodiment, z is an integer from 6 to 14, preferably from 8 to 12.

The ethoxylated alkylphenol-formaldehyde resin dispersant of the invention is a comb-like material which possesses multiple hydrophobic blocks and multiple hydrophilic blocks.

In the present invention, any of the known pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, a combination of cyan, magenta, yellow, and black (CMYK) pigments should be used. An exemplary four color set is copper phthalocyanine (pigment blue 15), quinacridone magenta (pigment red 122), pigment yellow 74 or pigment yellow 155 and carbon black (pigment black 7). Another exemplary four color set is bis(phthalocyanyl-alumino)tetra-phenyldisiloxane cyan pigment, quinacridone magenta (pigment red 122), pigment yellow 74 or pigment yellow 155 and carbon black (pigment black 7). In a preferred embodiment of the invention, the pigment has a particle size of from about 10 nanometers to about 1000 nanometers.

As noted above, the ink jet ink composition of the invention comprises from about 0.5% to about 30% by weight of a pigment. In a preferred embodiment of the invention, the ink composition comprises from about 1% to about 5% by weight of the pigment.

The carrier employed in the invention can be, for example, water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen-containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A humectant may also be employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 50%.

Ink Preparation

A preferred method for making the inks of the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, preferably approximately 1.0 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/ 5% diethylene glycol. The preferred ratios are approximately 60% water/40% diethylene glycol to about 95% water/ 5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont Corp. and the Fluorads® from the 3M Co.

Acceptable viscosity's are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A penetrant (0–10 wt. %) may be added to help the ink penetrate the receiving substrate, especially when the substrate is a highly sized paper. A preferred penetrant for the inks of the present invention is n-propanol at a final concentration of 1–6 wt. %. A biocide (0.01–1.0 wt. %) may be added to prevent unwanted microbial growth which may occur in the ink over time. A preferred biocide for the inks of the present invention is Proxel® GXL (Zeneca Colours Co.) at a final concentration of 0.05–0.5 wt. %. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

A list of the dispersants used in this example is given in Table 1. The list includes an example dispersant of the invention, I-1, and a range of comparison materials, which help illustrate the essential features of the invention.

TABLE 1

| Dispersant | Approximate chemical structure |
|---|---|
| I-1 | Formula above where x is 4, y, is 2, z is 10, R is octyl, A is sulfate and M is sodium. |
| C-1<br>Triton X-100 ®<br>(Used in DE 19850152) | Alkylaryl-polyethyleneoxide:<br>Octylphenyl-(OCH$_2$CH$_2$)$_n$OH, where n ≅ 9.5 on average |

TABLE 1-continued

| Dispersant | Approximate chemical structure |
|---|---|
| C-2<br>Triton X-200 ® | Alkylaryl-polyethyleneoxide sulfonate:Octylphenyl-(OCH$_2$CH$_2$)$_m$–SO$_3$Na, where m ≅ 2–4 |
| C-3<br>Triton X-770 ® | Alkylaryl-polyethyleneoxide sulfate:Octylphenyl-(OCH$_2$CH$_2$)$_k$–OSO$_3$Na |
| C-4<br>Di-sodium salt of the di-sulfate of Aldrich chemical 41,232-5. Chemical 41,232-5 is a poly(ethylene glycol)-block-poly(propylene glycol)-block-poly-(ethylene glycol)-block-copolymer with 80% polyethyleneoxide and Average M$_n$ ca. 8,400. | NaO$_3$S-(OCH$_2$CH$_2$)$_p$-[OCH(CH$_3$)CH$_2$]$_q$–(OCH$_2$CH$_2$)$_r$-SO$_4$Na<br>Where q ≅ 29 and p + r ≅ 153 on average |

Example 1

Synthesis of I-1

The ethoxylated alkylphenol-formaldehyde resin (trade name Tyloxapol®) (55g) was dissolved in 1,2-dichloroethane (1000 ml) and stirred at 20° C. Chlorosulfonic acid (1.9 ml) was added over 2 minutes. The mixture was then heated to 50° C. over 20 minutes and maintained at 50° C. for 2.5 hours. The solution was cooled and the solvent evaporated under reduced pressure. Warm water (40–50° C.) was added to dissolve the residual viscous product and the pH of the resultant solution adjusted to 10–11 with aqueous 4M sodium hydroxide solution. This clear solution was evaporated to dryness on a steam bath, then triturated with methanol (300 ml), the inorganic salts filtered off and the methanol evaporated. The resulting material was dried under high vacuum to give a colorless viscous product. Analysis for sulfur, S=1.53% (expected 1.6%).

Example 2

Synthesis of Dispersant, C-4 (Comparative Dispersant)

Aldrich chemical 41,232-5 ([See Table 1] 80 g, 9.5 mmol) was dissolved in 1,2-dichloroethane (1500 ml) and stirred at 20° C. Chlorosulfonic acid (2.5 ml, 38 mmol) was added over 2 minutes. The mixture was then stirred for a total of 30 minutes before heating to 50° C. The temperature was maintained at 50° C. for 3.5 hours. Thereafter the system was cooled and evaporated. The resulting residue was dissolved in warm water and 1-propanol, and then neutralised to pH 8–9 with 4N NaOH. The resultant solution was diluted with more 1-propanol and evaporated to dryness. The dried material was further dried in a vacuum oven at 20° C. over CaCl$_2$ to give a white solid as the final product (83.5g). Analysis for sulfur, S=0.73% (expected 0.8%).

Example 3

Preparation of Pigment Dispersions

Pigment dispersions were prepared by the milling process described below. The second column of Tables 2 and 3 list the constituents of each composition that was milled. Each composition contained the milling media (polymeric beads), the pigment to be dispersed, the dispersant, de-ionized water, and a biocide. In Table 2, the comparative dispersants were used to make the pigment dispersion. In Table 3, the invention dispersant was used to make the pigment dispersion.

The compositions listed in the second columns of Tables 2 and 3 were each milled in a 1 liter double walled vessel obtained from BYK-Gardner using a high energy media mill manufactured by Morehouse-Cowles Hochmeyer. The mill was run for approximately 5 hours at room temperature. The resulting dispersions were separated from the milling media by filtering the millgrind through a 4–8 μm KIMAX® Buchner Funnel obtained from VWR Scientific Products. Particle size distributions were obtained on diluted millgrind samples (about 50:1) using a Leeds & Northrop Ultrafine Particle Analyzer (UPA). The results are listed as a fresh 50% median value. A sample of the dispersion was heated at 60° C. for a total of 3–7 weeks. After a period of 1–2 weeks and again after 3–7 weeks, samples of the dispersion tested for particle size stability using the UPA. The 50% median values at fresh, 1–2 weeks and 3–7 weeks are listed in columns 3, 4 and 5 respectively of Tables 2 and 3. The following results were obtained:

TABLE 2

| Dispersion | Composition | Fresh | 2 Weeks @60° C. | 4 Weeks @60° C. |
|---|---|---|---|---|
| CD-1 (Comparison) | Polymeric beads-mean diameter 50 μm (162.5g) Cyan Pigment - Bis (phthalocyanyl-alumino) tetra-Phenyldisiloxane (10.0 g) Triton X100 ®, dispersant C-1 (15.0 g) De-ionized water (100.0 g) Proxel ® GXL biocide (0.1 g) | 339 | 550 | 667 |
| CD-2 (Comparison) | Polymeric beads (as CD-1) Cyan Pigment Bis (phthalocyanyl-alumino) tetra-Phenyldisiloxane (10.0 g) Triton X200 ®, dispersant C-2 (15.0 g) De-ionized water (100.0 g) Proxel ® GXL biocide (0.1 g) | 140 | 166 | 155 |
| CD-3 (Comparison) | Polymeric beads (as CD-1) Cyan Pigment Bis (phthalocyanyl-alumino) tetra-Phenyldisiloxane (10.0 g) Triton X770 ® dispersant, C-3 (15.0 g) De-ionized water (105 g) Proxel ® GXL (0.1 g) | 163 | 164 | 172 |
| CD-4 (Comparison) | Polymeric beads (as CD-1) Cyan pigment Bis (phthalocyanyl-alumino) tetra-Phenyldisiloxane (10.0 g) Dispersant C-4 (5 g) De-ionized water (110 g) Proxel ® GXL (0.1 g) | 231 | 496 | 409 |
| CD-5 (Comparison) | Polymeric beads (as CD-1) Cyan pigment Bis (phthalocyanyl-alumino) tetra-Phenyldisiloxane (10.0 g) Dispersant C-4 (10 g) De-ionized water (105 g) Proxel ® GXL (0.1 g) | 159 | 147 | 125 |

TABLE 3

| Dispersion | Composition | Fresh | Weeks @60° C. | Weeks @60° C. |
|---|---|---|---|---|
| ID-1 (Invention) | Polymeric beads (as CD-1) Cyan pigment Bis (phthalocyanyl-alumino) tetra-Phenyldisiloxane (10.0 g) Dispersant I-1 (5 g) De-ionized water (110 g) Proxel ® GXL (0.1 g) | 21 | 12 (2 wks.) | 14 (7 wks.) |
| ID-2 (Invention) | Polymeric beads (as CD-1) Cyan pigment as ID-I (10.0 g) Dispersant I-1 (10 g) De-ionized water (105 g) Proxel ® GXL (0.1 g) | 44 | 15 (2 wks.) | 19 (7 wks.) |
| ID-3 (Invention) | Polymeric beads (as CD-1) Pigment Blue 15:3 (10 g) Dispersant I-1 (5 g) De-ionized water (110 g) Proxel ® GXL (0.1 g) | 54 | 34 (1 wk.) | 35 (3 wks.) |
| ID-4 (Invention) | Polymeric beads (as CD-1) Pigment Blue 15:3 (10 g) Dispersant I-1 (10 g) De-ionized water (105 g) Proxel ® GXL (0.1 g) | 25 | 31 (1 wk.) | 31 (3 wk.) |
| ID-5 (Invention) | Polymeric beads (as CD-1) Pigment Red 122 (10.0 g) Dispersant I-1 (5 g) De-ionized water (110 g) Proxel ® GXL (0.1 g) | 12 | 12 (1 wk.) | 13 (3 wks.) |
| ID-6 (Invention) | Polymeric beads (as CD-1) Pigment Yellow 155 (10.0 g) Dispersant I-1 (5 g) De-ionized water (110 g) Proxel ® GXL (0.1 g) | 14 | 12 (1 wk.) | 13 (3 wks.) |
| ID-7 (Invention) | Polymeric beads (as CD-1) Pigment Black 7 (10.0 g) Dispersant I-1 (5 g) De-ionized water (110 g) Proxel ® GXL (0.1 g) | 120 | 107 (1 wk.) | 104 (3 wks.) |

The above results show that the dispersions produced using the dispersant employed in the invention had a smaller particle size than the control dispersions and were stable at elevated temperatures.

The invention has been described in detail with particular reference to certain preferred embodiments thereof, but it will be understood that variations and modifications can be effected within the spirit and scope of the invention.

What is claimed is:

1. An ink jet ink composition comprising from about 0.5% to about 30% by weight of a pigment, a carrier and a dispersant, said dispersant comprising an anionic derivative of an ethoxylated alkylphenol-formaldehyde resin, the ratio of dispersant:pigment being from about 0.1:1 to about 5:1, said anionic derivative of an ethoxylated alkylphenol-formaldehyde resin having the formula:

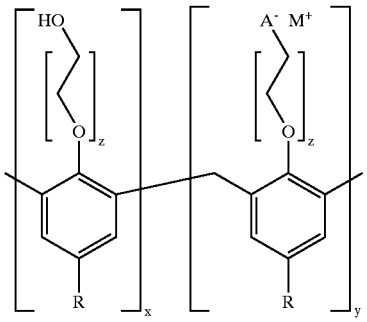

wherein:
  each R independently represents a linear or branched alkyl, alkenyl, or arylalkyl group having from about 4 to about 30 carbon atoms;
  x is an integer from 0 to 20;
  y is an integer from 1 to 20; with the proviso that x+y is from 2 to 20;
  z is an integer from 4 to 20;
  A is an anionic group comprising sulfate, sulfonate, phosphate, phosphonate or carboxylate; and
  M is a cationic group.

2. The composition of claim 1 wherein each R independently represents a linear or branched alkyl, alkenyl, or arylalkyl group having from about 8 to about 12 carbon atoms.

3. The composition of claim 1 wherein x+y is from 6 to 8.

4. The composition of claim 1 wherein z is an integer from 8 to 12.

5. The composition of claim 1 wherein M is an alkali metal, alkaline earth metal, ammonium or substituted ammonium.

6. The composition of claim 1 wherein a humectant is present in an amount of up to about 70% by weight of said composition.

7. The composition of claim 1 wherein R is octyl.

8. The composition of claim 1 wherein A is sulfate.

9. The composition of claim 1 wherein M is sodium.

10. The composition of claim 1 wherein x is 4.

11. The composition of claim 1 wherein y is 2.

12. The composition of claim 1 wherein z is 10.

13. The composition of claim 1 wherein said carrier is water.

14. The composition of claim 1 wherein said ink jet ink comprises from about 1% to about 5% by weight of said pigment.

15. The composition of claim 1 wherein said dispersant is present in a ratio of dispersant:pigment from about 0.25:1 to about 2.5:1.

* * * * *